C. J. HALBORG.
MACHINE FOR BACKING OFF HOBS OR CUTTERS FOR CUTTING GEARS.
APPLICATION FILED SEPT. 19, 1912.

1,092,571.

Patented Apr. 7, 1914.

2 SHEETS—SHEET 1.

Witnesses:
Patrick D. Walsh
Hilda A. Lundberg

Inventor:
Carl J. Halborg.
By Oscar A. Perrigo
ATTORNEY.

C. J. HALBORG.
MACHINE FOR BACKING OFF HOBS OR CUTTERS FOR CUTTING GEARS.
APPLICATION FILED SEPT. 19, 1912.
1,092,571.
Patented Apr. 7, 1914.
2 SHEETS—SHEET 2.
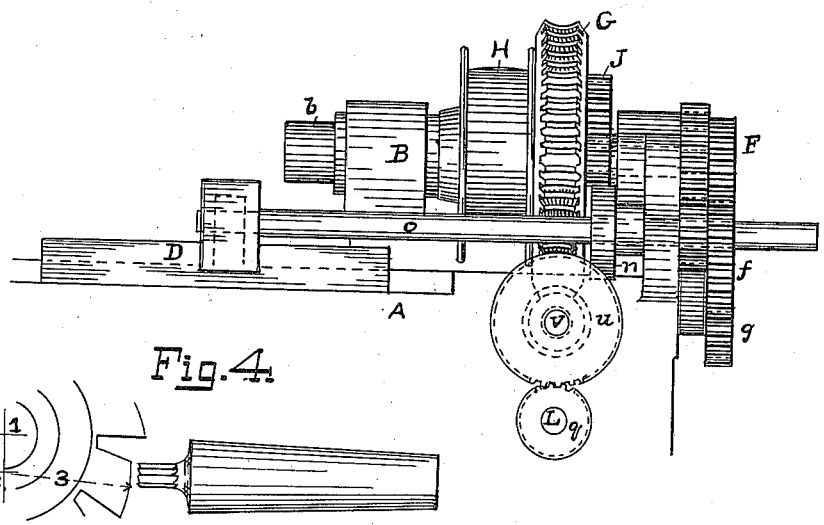
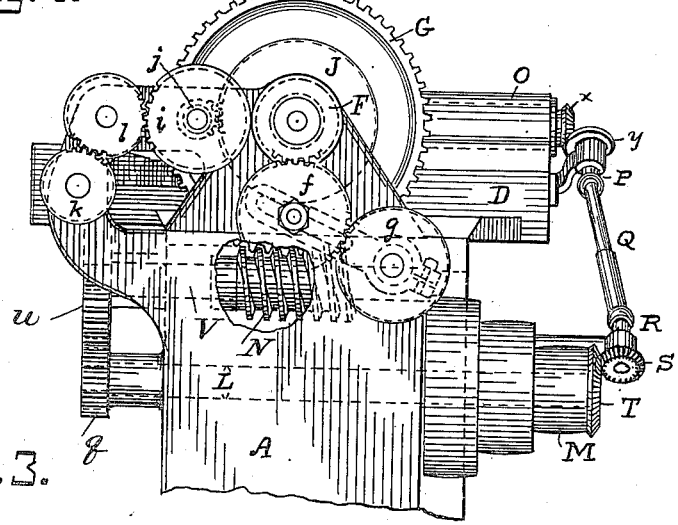
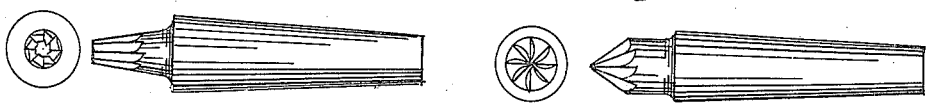
Witnesses:
Patrick D. Walsh
Hilda A. Lundberg
Inventor:
Carl J. Halborg,
By Oscar E. Perrigo
ATTORNEY.

UNITED STATES PATENT OFFICE.

CARL J. HALBORG, OF ROCKFORD, ILLINOIS.

MACHINE FOR BACKING OFF HOBS OR CUTTERS FOR CUTTING GEARS.

1,092,571.  Specification of Letters Patent.  Patented Apr. 7, 1914.

Application filed September 19, 1912. Serial No. 721,380.

*To all whom it may concern:*

Be it known that I, CARL J. HALBORG, a citizen of the United States, residing at Rockford, in the county of Winnebago and State of Illinois, (whose post-office address is 520 Thirteenth street, Rockford, Illinois,) have invented a new and useful Improvement in Machines for Backing Off Hobs or Cutters for Cutting Gears, of which the following is a specification.

My machine relates to mechanical means for "backing-off" the teeth of hobs used for cutting spur, spiral and worm gears, and is in the nature of a complete machine for accurately performing this work, including the proper means for supporting the hob to be acted upon, supporting the tool for doing the work and suitable mechanism for producing the desired movements of both tool and the hob to be acted upon.

The object of my invention is to provide suitable mechanical means whereby a hob or cutter upon whose blank cylindrical surface a thread has been cut of proper form to fit the spaces between the teeth of a spur, spiral or worm gear, and said thread has been broken up by grooves milled parallel to its axis of revolution, forming said thread into teeth or cutting edges, may have the outer arc and the sides of said teeth reduced from the cutting edge back, upon an arc whose center is somewhat forward of the normal center of said cylinder, thus producing teeth, which when dulled from use, may be ground upon their cutting faces without changing their form. In pursuance of this requirement, my object is to provide a certain form of tool that shall require the least amount of pressure to hold it in contact with the work, and therefore do the most accurate work, and therefore produce the most accurate hobs or cutters possible.

A further object in keeping with the above requirement is to provide suitable mechanism for supporting the hob to be acted upon, the tool for performing the required operation, and for producing the proper movements of said tool and hob so as to attain the desired result.

I accomplish these objects by means of the mechanism shown in the accompanying drawing, in which—

Figure 2:
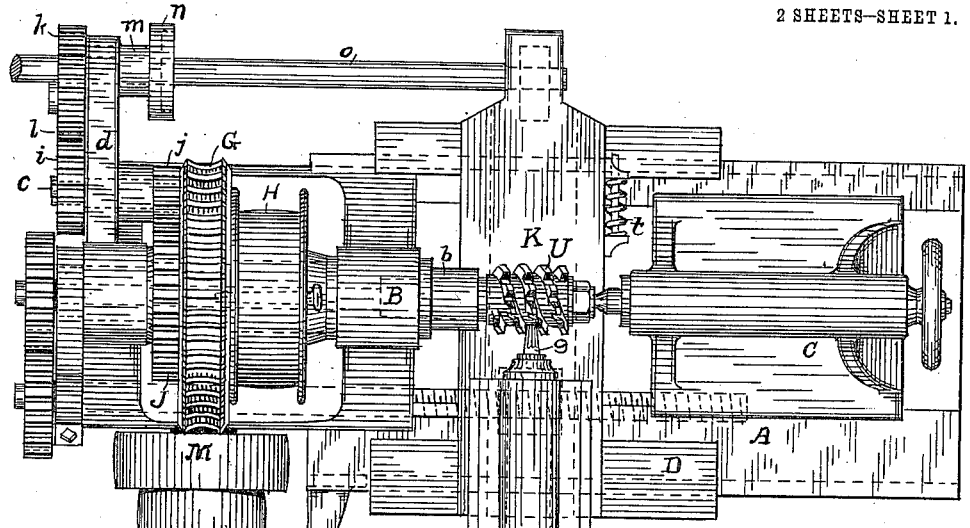
Figure 1:
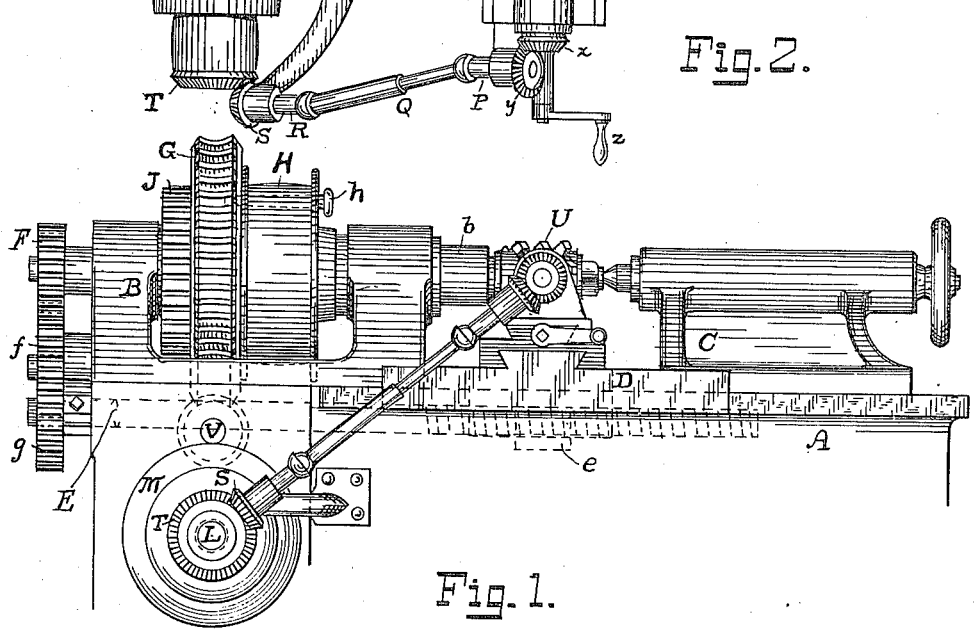
Figure 6:
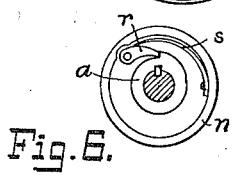
Figure 5:
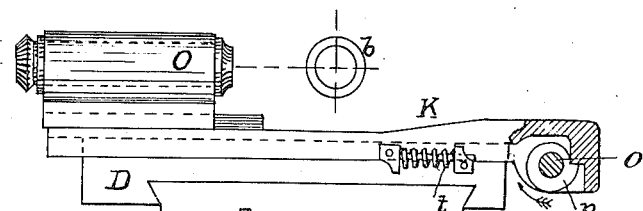

Figure 1 is a front elevation; Fig. 2 is a plan; Fig. 3 is a head end elevation and Fig. 4 is a partial rear elevation of my backing-off machine; Fig. 5 is a side elevation of the supporting carriage showing the reciprocating cam, etc.; Fig. 6 is an elevation of the cam shaft ratchet; Fig. 7 is a diagram of the teeth of a cutter and the tool for forming the peripheral arc; Fig. 8 is an elevation of a tool for trimming the corners of the cutting teeth; and Fig. 9 is an elevation of a tool for shaping the sides of the cutting teeth.

Similar letters of reference refer to similar parts in the several views.

My machine is constructed on the general design of a lathe, having a bed A, a headstock B, a tailstock C, and a carriage D, which is drawn along the bed A by the usual lead screw E, and change gears F, $f$, $g$, deriving motion from the main spindle $b$. The lead screw E is connected with the carriage D by means of the lead screw nut $e$, fixed to the carriage.

The driving mechanism is as follows: Fixed upon the main spindle $b$ is the spur gear J, and the backing pulley H, while running loosely upon it is the worm gear G. The worm gear G and backing pulley H may be connected when desired by the pin $h$. The spur gear J engages the spur pinion $j$, fixed to a short shaft $c$, journaled in the bracket $d$, forming a part of the headstock B. Upon the outer end of the shaft $c$ is fixed the spur gear $i$, connected with the spur gear $k$, by means of the idle gear $l$ journaled upon a stud fixed in the bracket $d$. The spur gear $k$ is integral with the sleeve $m$, which has fixed to it the transmitting ratchet case $n$, running loosely upon the cam shaft $o$. Fixed upon the cam shaft $o$ is the single-toothed ratchet $a$, (Fig. 6), which is engaged by the pawl $r$ pivoted to the case $n$ and held in contact with the ratchet $a$ by the spring $s$; by which means the motion transmitted through the gears J, $j$, $i$, $k$, and $l$ is operative to revolve the cam shaft $o$ in one direction but not in the reverse direction. The cam shaft $o$ is splined through the sleeve $m$ and its opposite end journaled in a rearwardly projecting and box-like end of the carriage D, and has fixed to it the cam $p$, (Fig. 5), whose cam surface rests against a ledge on the top slide K resting on the carriage D, as shown. By the revolution of the cam $p$ in direction of the arrow the slide K is forced toward the rear, and at the completion of each revolution is brought back to the position shown by the spring $t$, one end of which is attached to the carriage D and the other to the slide K.

Passing transversely through the bed A beneath the headstock B is the driving shaft L, to the front end of which is fixed the driving cone pulley M, and at its rear end the spur gear $q$, which engages the spur gear $u$ fixed to the rear end of the worm shaft V, upon the center of which is fixed the worm N, engaging the worm gear G. By this means power applied to the cone pulley M, acting through the spur gears J, $j$, $i$, $k$, $l$, is communicated to the cam shaft $o$ and cam $p$.

Adjustably attached to the front end of the slide K is the tool block O which has journaled in it the tool spindle $w$, upon the outer end of which is fixed the miter gear $x$, which engages with a similar gear $y$ on the upper end of the shaft P, journaled in a bracket attached to the tool block O, and connected by ball and socket joints, and the telescoped shaft Q, with a similar shaft R, journaled in a bracket attached to the bed A of the machine. To this shaft is fixed the bevel pinion S, engaging a bevel gear T fixed to the driving shaft L, by which means motion is communicated from the cone pulley M to the tool spindle $w$ in whatever working position it may be with relation to the driving shaft L. The tool block O may be adjusted to and from the center of the machine by the usual cross screw and crank $z$.

In the tool spindle $w$ may be placed any of the end mills shown in Figs. 7, 8, and 9. In the main spindle $b$ may be placed an arbor upon which the hob U or cutter to be backed-off may be temporarily fixed, the outer end being supported by the center of the tailstock C.

Referring to Fig. 7, the gear cutter is shown in its usual finished form, that is, after the operation of "backing-off." The normal center of the cutter as it leaves the lathe and the form of the teeth which it is to cut is provided for by shaping the sides of its teeth, the points of the teeth being in the original circle of its periphery. But such a cutter would be inoperative as a tool for cutting gear teeth as there is, as yet, no clearance to the cutting edges. This is provided for in the operation of "backing-off." But this must be done in such a manner as to preserve the form when the cutter is dulled from use and the faces of the teeth must be sharpened by grinding. To accomplish this the ends of the teeth must be formed on an arc whose center is somewhat below the normal center of the cutter. This normal center is at 1 while the center of the arc formed by "backing-off" is at 2, the broken line 3 representing the radius. Fig. 7 shows the proper form of an end mill to produce this arc, when used in my machine. Fig. 9 shows the proper form of a milling cutter to use in shaping the sides of the teeth, and Fig. 8, the angle mill for relieving the sharp corners at the ends of the teeth so as to leave a small fillet at the bottom of the teeth in the gear to be cut. This mill may have a curved instead of a straight form, if a curved fillet is desired. The change in the center 2 from which the radius 3 is struck is produced by the reciprocating action of my machine, as will be explained.

The above explanation relates to a single gear cutter. With a similar form of teeth upon a hob adapted to cut teeth of worm or spiral gears, the principle of the thread requires that the milling tool or end mill must be moved in a lateral direction as well as in and out, hence my machine is provided with a lead screw for moving the carriage laterally.

The operation of my machine is as follows, it being assumed that the teeth of a hob are to be "backed-off:" The hob U having been formed, the thread cut and this thread broken up into teeth by longitudinal grooves, in the usual manner, it is fixed upon an arbor fitting the main spindle $b$ and the opposite end supported by the tailstock center as in a lathe. The end mill shown in Fig. 7 is placed in the tool spindle $w$, the change gears F, $f$, $g$ arranged to suit the pitch of the hob, the gears J, $j$, $i$, and $k$ giving the number of revolutions to the cam shaft $o$ to coincide with the number of teeth of the hob, the locking pin $h$ being in place, connecting the backing pulley H with the worm gear G, the entire mechanism moves with the application of power to the cone pulley M, acting through the medium of the worm gear G to the trains of spur gearing. The tool spindle $w$ is driven by the bevel gears T S, the miter gears $x$ $y$ and the telescoping shaft Q. As the end mill commences its cut upon the end of a tooth the cam $p$ (Fig. 5), draws the slide K, tool block O and the end mill toward the center of the hob, producing the arc 3, Fig. 7. Just previous to reaching the next tooth the cam $p$ has passed over the contact ledge of the slide K resting against it and the spring $t$ draws the slide K back to its original point as shown in Fig. 5. This operation is repeated on each tooth in succession, the lead screw E drawing the carriage D forward in exact conformity with the pitch of the thread on the hob U. The tops of all the teeth having been formed as desired, the locking pin $h$ is removed, power is applied to the backing pulley H in a reverse direction, and all the moving parts brought back to their original position. The end mill 7 is now replaced by that shown in Fig. 9, (as shown in Fig. 2) and the sides of the teeth backed off by an operation similar to that just described. The corners of the teeth are operated upon by the end mill shown in Fig. 8 in a similar manner. Formerly such backing-off operations have been done with a tool having a single cutting edge, usually known as a "forming tool." The pressure required for forcing a cut by the broad edge of such a tool is excessive and the result is a lack of accuracy, unless a number of light cuts are taken. This occupied too much time and the work is, at best, slowly and inefficiently performed.

It is well known that an end mill having a number of comparatively fine cutting edges or teeth, and revolving with considerable rapidity requires the least pressure of any form of tool known. This fact makes it the most accurate cutting tool in existence. Hence it is best adapted to the purposes I have described and will not only perform the work with great accuracy but with great rapidity as compared with the usual methods.

I therefore claim as my invention:

In a machine of the class specified the combination of a bed, a head stock fixed thereon, a tail stock and a carriage slidably supported on said bed, a spindle journaled in said head stock, means for rotating said spindle, a lead screw and nut adapted to move said carriage laterally, means for transmitting motion from said spindle to said lead screw, a transversely sliding member mounted on said carriage, a cam shaft, means for rotating the same, a ratchet device mounted upon said cam shaft and adapted to transmit motion in one direction only, a single throw cam fixed to said cam shaft and adapted to move said transversely sliding member in one direction, a spring adapted to move said transversely sliding member in the opposite direction, a tool block mounted upon said transversely sliding member, a tool spindle journaled in said tool block and adapted to receive an end mill, an end mill, and means for rotating said tool spindle and end mill, substantially as shown and described and for the purposes set forth.

CARL J. HALBORG.

Witnesses:
 NELS E. HALBORG,
 GEO. C. HALBORG.